Figures 1, 5, 6:
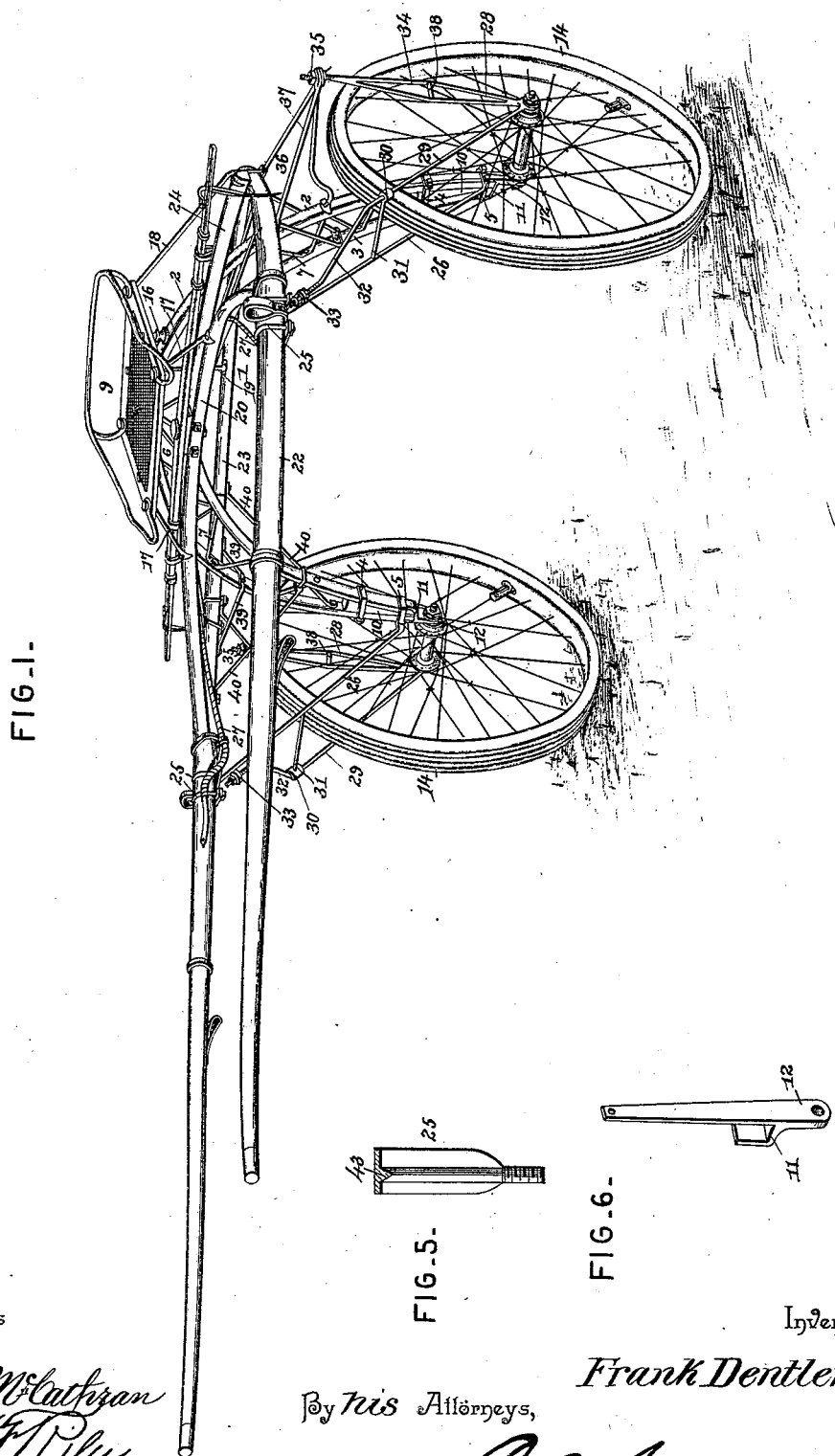

(No Model.) 2 Sheets—Sheet 1.

F. DENTLER.
SULKY.

No. 512,686. Patented Jan. 16, 1894.

Witnesses
Jas. K. M?Cathran
N. J. Riley

By his Attorneys,
C. A. Snow & Co.

Inventor
Frank Dentler (No Model.) 2 Sheets—Sheet 2.
F. DENTLER.
SULKY.
No. 512,686. Patented Jan. 16, 1894.
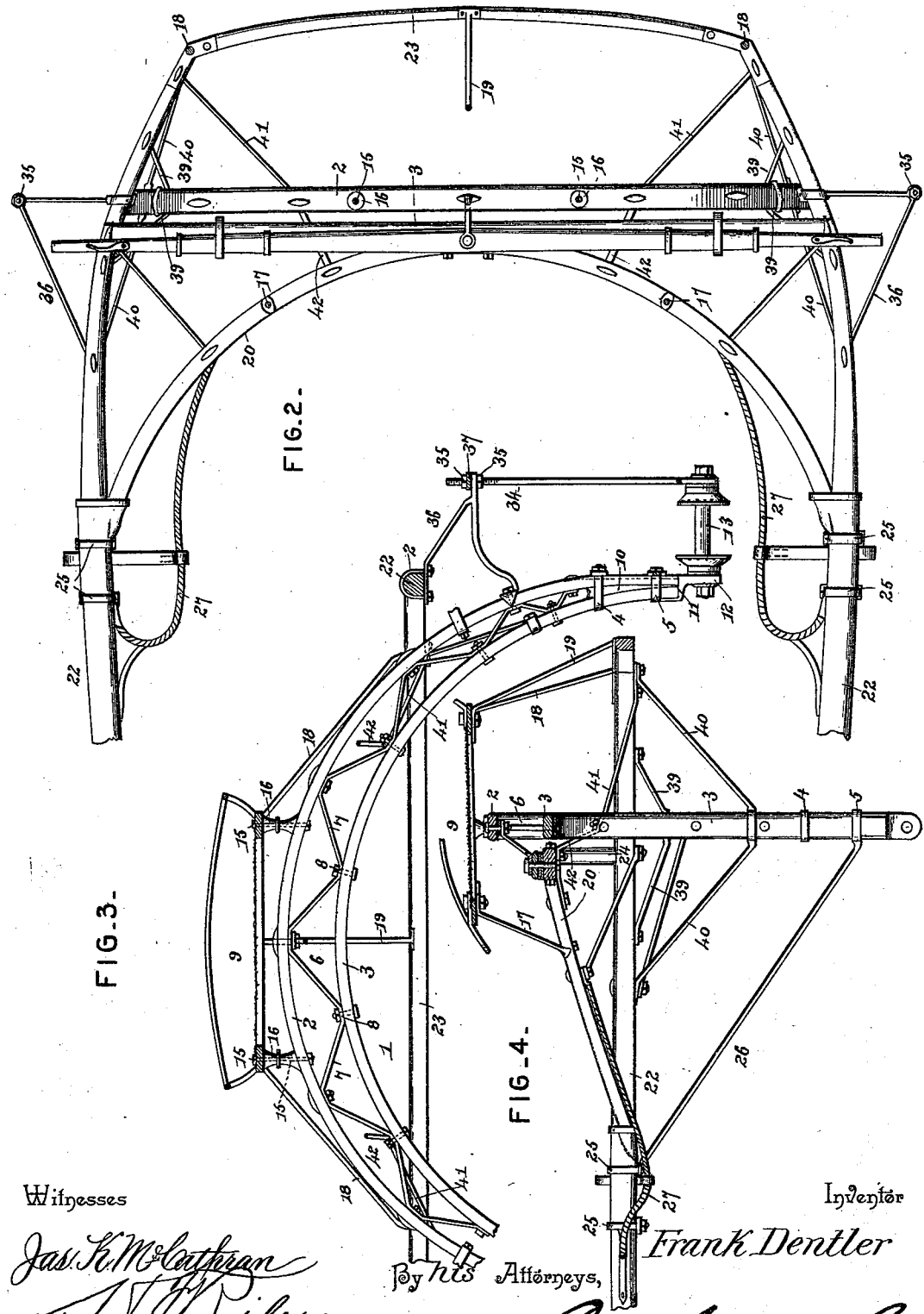
Witnesses
Jas. K. McCathran
J. N. Riley
Inventor
Frank Dentler
By his Attorneys,
C. A. Snow & Co.

UNITED STATES PATENT OFFICE.

FRANK DENTLER, OF PARKVILLE, MICHIGAN.

SULKY.

SPECIFICATION forming part of Letters Patent No. 512,686, dated January 16, 1894.

Application filed December 23, 1892. Serial No. 456,156. (No model.)

*To all whom it may concern:*

Be it known that I, FRANK DENTLER, a citizen of the United States, residing at Parkville, in the county of St. Joseph and State of Michigan, have invented a new and useful Sulky, of which the following is a specification.

The invention relates to improvements in sulkies.

The object of the present invention is to improve the construction of sulkies and to provide one which by reason of its lightness will be especially adapted for racing and speeding, and which will afford a perfectly rigid seat for the driver.

The invention consists in the construction and novel combination and arrangement of parts hereinafter fully described, illustrated in the accompanying drawings and pointed out in the claims hereto appended.

In the drawings—Figure 1 is a perspective view of a sulky embodying the invention. Fig. 2 is a plan view of the same, the seat being removed. Fig. 3 is a transverse sectional view. Fig. 4 is a vertical sectional view. Fig. 5 is a detail sectional view of one of the clips. Fig. 6 is a detail perspective view of one of the sockets which receive the ends of the axle.

Like numerals of reference indicate corresponding parts in all the figures of the drawings.

1 designates an arched axle composed of upper and lower bowed bars 2 and 3 of different degrees of curvature having their ends secured together by clips 4 and 5; and the curved axle bars 2 and 3 are supported and strengthened by a continuous truss brace 6, which is arranged in the curved space between the axle bars 2 and 3 and conforms to the shape of the space. The truss brace 6, which has a general curve throughout its length, tapers in width from the middle toward each end, and is composed of a series of inclined portions 7, which form a series of V-shaped trusses and which are connected by perforated portions 8, adapted for the reception of bolts for securing the truss brace to the axle bar. This construction forms a perfectly rigid springless axle and provides an unyielding support for a seat 9. The ends of the curved axle bars 2 and 3 have wedge-shaped pieces 10, interposed between them, and are secured in sockets 11 by the clips 5; and the sockets 11 have depending extensions 12 forming continuations of the axle and provided with openings in which are secured laterally extending spindles 13. The spindles 13 have journaled on them wheels 14 which are preferably provided with pneumatic tires as shown, but which may be of any other desirable construction.

The seat 9 is secured over the axle by vertical bolts 15, which pass through the bottom of the seat and the upper curved bar 2 of the axle and also through approximately cylindrical supporting posts 16, which are interposed between the seat and the axle and are arranged at opposite sides of the former. The seat is braced at the corners by front and rear rods 17 and 18 and at the center of the back by a rod 19. The front rods 17 are inclined and extend from the front corners of the seat to a curved cross-bar 20, which has a single-tree 21 pivoted to it and which has its ends secured to thills 22 in advance of the single-tree. The rear rods 18 incline downward from the rear corners of the seat to the rear ends of the thills which are connected by a rear cross-bar 23; and the bracing rod 19 extends upward from the center of the cross-bar 23 to the back of the seat. The thills are connected near their rear ends by a slightly arched cross-bar 24 arranged adjacent to the cross-bar 20 slightly in rear thereof.

The thills are braced in advance of the axle at the inner sides of the wheels by inclined bracing rods 26 extending upward and forward from the ends of the axle, to which they are secured by the lower clips 5, to the lower faces of the thills where they are secured by clips 25. The lower end of each of the rods 26 is bent at an angle and perforated to form a clip plate; and the upper end of the rod 26 is provided with an integral clip-plate for the clip 25. A pair of clips 25 is arranged on each thill, the advanced ones serving to fasten the front portions of foot rests 27 to the thills. At the outer side of each wheel is located a V-shaped brace 28 provided at its apex with an opening to receive the outer end of the spindle, and having its front side 29 arranged in an eye 30 of a laterally extending arm 31 of the forwardly and upwardly inclined rod 26, and inclined inward at 32 above the arm and the adjacent wheel and extended approximately parallel with the rod 26 at its upper end. The upper end of the front side 29 of the V-shaped brace 28 is threaded and arranged in a perforated lug 33 of the rod 26 and secured to the lug by nuts arranged above and below the lug, whereby an adjustable attachment is provided to enable the parts to be readily adapted and arranged according to the character of the wheels employed. The rear side 34 of the V-shaped brace 28 is trussed and has its upper end threaded and secured by nuts in an eye 35 of a laterally extending V-shaped brace 36, which has its upwardly inclined sides clipped to the adjacent thill and its lower side bolted to the upper axle bar 2. The nuts are arranged above and below the eye 35 to provide an adjustable connection, and also serves to secure the rear end of a brace bar 37 to the upper end of the rear side 34; and the brace rod or bar 37 extends forward from the rear side of the V-shaped brace 28 to the adjacent thill and is fastened to the lower face of the same. The truss of the rear side 34 is formed by similar oppositely disposed integral angle rods, and an integral strut 38 connecting the angle rods at their centers.

The thills are supported at each side of the sulky by upper and lower inclined V-shaped braces 39 and 40 extending respectively from the upper and lower axle bars to the lower face of the adjacent thill.

At each side of the sulky is arranged an angle brace rod 41 extending inward and inclining upward from the rear end of the thill to the upper face of the lower curved axle bar 3, and bent upward thereat to provide an inclined portion 42 and secured to the lower face of the bar 24 and extended therefrom and secured to the lower face of the cross-bar 20.

In order to prevent the clips slipping on the wood, they are provided with an interior V-shaped rib 43 adapted to bite into the wood. This construction enables great strain to be brought to bear on a clip without any liability of the clip slipping, even should the clip be located on a tapering part.

It will be seen that the sulky is simple and comparatively inexpensive in construction, that it is strong and durable, rigid and springless to adapt it for racing, and that the braces extending from the thills to the ends of the axle may be readily adjusted to set the wheels properly.

Changes in the form, proportion and the minor details of construction may be resorted to without departing from the principle or sacrificing any of the advantages of the invention.

What I claim is—

1. In a sulky, an axle comprising the upper and lower arched bars of different degrees of curvature having their ends secured together, and the continuous curved truss brace conforming to the shape of the space between the arched bars and arranged therein and secured to said bars and consisting of a series of oppositely inclined portions forming V-shaped braces, substantially as described.

2. In a sulky, an axle comprising the upper and lower curved bars having their ends secured together, and the curved truss brace gradually tapering from the middle toward each end and arranged in the space between the curved bars and bolted to the same and consisting of a series of integral oppositely inclined portions and perforated securing portions adapted for the reception of bolts, substantially as described.

3. In a sulky, the combination of the upper and lower curved axle bars, wedges interposed between the ends of the bars, and conforming to the configuration of and entirely filling the space between the axle bars at the point of securement of the latter, and clips securing the ends of the bars together, substantially as described.

4. In a sulky, the combination of an axle, thills, an inclined brace rod extending from the axle to a thill and provided near its upper end with a perforated lug, a brace rod extending upward from the outer end of the spindle of the axle and bent inward near its upper end and threaded and arranged in the perforation of said lug, and nuts arranged on the threaded portion of the rod and located above and below the lug, whereby the outer brace rod is adjustably connected to the inner brace rod substantially as described.

5. In a sulky, the combination with an axle, thills, an inclined brace rod extending upward from the axle at a point adjacent to the inner end of one of the spindles to the adjacent thill and having near its upper end a perforated lug, and provided intermediate of its ends with a laterally extending arm having an eye at its outer end, and an inclined rod extending upward from the outer end of the spindle, arranged in said eye and adjustably secured to said lug, substantially as described.

6. In a sulky, the combination of an arched axle, thills, a V-shaped brace secured at its apex to the outer end of one of the spindles, an inclined brace 26 extending upward from the axle adjacent to the inner end of the spindle to the adjacent thill and having the upper end of the front side of the V-shaped brace secured to it, and a brace extending laterally from the sulky and secured to the upper end of the rear side of the V-shaped brace, substantially as described.

7. In a sulky, the combination of an arched axle, a spindle, a wheel journaled on the spindle, a thill located above the wheel, an inclined brace extending upward from the axle at the inner side of the wheel to the thill, a laterally extending V-shaped brace having its sides secured to the thill and the axle, and a V-shaped brace secured to the outer end of the spindle and having its front side adjustably secured to the upper end of the inclined brace and its rear side similarly secured to the laterally extending V-shaped brace, substantially as described.

8. In a sulky, the combination of an arched axle having a spindle, a laterally extending brace connected with the axle, a thill, a V-shaped brace extending upward from the outer end of the spindle and having its front arm connected with the axle and its rear arm secured to the laterally extending brace and consisting of opposite integral angle rods and an integral strut connecting the centers of the rods, substantially as described.

9. In a sulky, the combination of an arched axle provided with spindles and having upper and lower curved bars, thills, inclined braces 26 extending from the lower ends of the axle to the thills, V-shaped braces secured to the outer ends of the spindles and having their front sides secured to the upper ends of the inclined braces, the laterally extending braces extending from the thills and the axle to the upper ends of the rear sides of the V-shaped braces, and the inwardly inclined V-shaped braces extending from the thills to the upper and lower axle bars, substantially as described.

10. In a sulky, the combination of the arched axle having upper and lower curved axle bars, thills extending rearward beyond the axle, cross-bars 20 and 24 connecting the thills, and angle braces 41 extending inward and forward from the rear ends of the thills to the lower axle bar and bent upward and secured to the cross-bar 24 and extended forward and secured to the cross-bar 20, substantially as described.

11. In a sulky, the combination with an axle, thills, an inclined brace rod extending upward from the axle at a point adjacent to the inner end of one of the spindles to the adjacent thill, and an inclined rod extending upward from the outer end of the spindle, and adjustably secured to said brace rod, substantially as described.

12. In a sulky, the combination with the axle and thills, the brace rod 26, the side brace 28, and the top brace 36, the braces 28 and 36 being secured together above the wheel, and the braces 26 and 28 being joined in advance of the wheel, substantially as described.

13. In a sulky, the combination of an arched axle having upper and lower curved axle bars, thills extending rearward beyond the axle, a cross-bar connecting the rear ends of the thills, and the pairs of V-shaped braces extending from the thills to the axle and connected respectively with the upper and lower curved axle bars of the latter and extending forward and rearward from the same, substantially as described.

In testimony that I claim the foregoing as my own I have hereto affixed my signature in the presence of two witnesses.

FRANK DENTLER.

Witnesses:
ARTHUR H. MARVILL,
IRA W. BURNS.